United States Patent [19]
Witt et al.

[11] Patent Number: 5,684,422
[45] Date of Patent: Nov. 4, 1997

[54] PIPELINED MICROPROCESSOR INCLUDING A HIGH SPEED SINGLE-CLOCK LATCH CIRCUIT

[75] Inventors: David B. Witt; Marty Pflum, both of Austin, Tex.

[73] Assignee: Advanced Micro Devices, Inc., Sunnyvale, Calif.

[21] Appl. No.: 722,902

[22] Filed: Sep. 27, 1996

Related U.S. Application Data

[63] Continuation of Ser. No. 378,175, Jan. 25, 1995, abandoned.
[51] Int. Cl.$^6$ .................................................. H03H 11/26
[52] U.S. Cl. ........................... 327/261; 327/199; 327/285; 327/401
[58] Field of Search .................................... 327/202, 203, 327/218, 288, 285, 399, 401, 261, 199, 208, 210, 211, 212, 219

[56] References Cited

U.S. PATENT DOCUMENTS

| | | | |
|---|---|---|---|
| 3,812,384 | 5/1974 | Skorup | 327/203 |
| 4,495,629 | 1/1985 | Zasio et al. | 327/202 |
| 4,831,286 | 5/1989 | Garcia et al. | 326/93 |
| 4,933,575 | 6/1990 | Aso | 327/218 |
| 5,015,875 | 5/1991 | Giles et al. | 327/203 |
| 5,105,100 | 4/1992 | Yamada | 327/202 |
| 5,124,572 | 6/1992 | Mason et al. | 327/145 |
| 5,140,179 | 8/1992 | Takano | 327/203 |
| 5,212,411 | 5/1993 | Asazawa | 327/203 |
| 5,227,674 | 7/1993 | Takahashi et al. | 327/202 |
| 5,239,206 | 8/1993 | Yanai | 327/202 |
| 5,264,738 | 11/1993 | Veendrick et al. | 327/203 |
| 5,280,203 | 1/1994 | Hung et al. | 327/202 |
| 5,317,205 | 5/1994 | Sato | 327/199 |
| 5,357,144 | 10/1994 | Tanaka | 327/202 |
| 5,459,421 | 10/1995 | Shaw | 327/203 |
| 5,471,158 | 11/1995 | Mehta | 327/203 |

FOREIGN PATENT DOCUMENTS

| | | |
|---|---|---|
| 0 285 892 A3 | 10/1988 | European Pat. Off. |
| 0 573 326 A1 | 12/1993 | European Pat. Off. |
| 43 20 681 A1 | 1/1994 | Germany |
| 63-16710 | 1/1988 | Japan ........ 327/211 |
| 63-18814 | 1/1988 | Japan ........ 327/203 |
| 1-24505 | 1/1989 | Japan ........ 327/203 |
| 1-241913 | 9/1989 | Japan |
| 2-104016 | 4/1990 | Japan ........ 327/203 |
| 4-220810 | 8/1992 | Japan ........ 327/203 |
| 5-110386 | 4/1993 | Japan ........ 327/199 |
| 5-110387 | 4/1993 | Japan ........ 327/199 |
| 5-110391 | 4/1993 | Japan ........ 327/218 |
| 5-206792 | 8/1993 | Japan ........ 327/199 |
| 5-335899 | 12/1993 | Japan ........ 327/202 |
| 6-45879 | 2/1994 | Japan ........ 327/203 |

OTHER PUBLICATIONS

G.A. Maley and D.W. Westcott, "IBM Technical Disclosure Bulletin," vol. 25 No. 9, Feb. 1983, 2 pages.

Frank Gonzalez, Design Ideas, "Spare inverters form a transparent D latch," 2119 EDN–Electrical Design News, Apr. 28, 1988, No. 9, 1 page.

*Primary Examiner*—Timothy P. Callahan
*Assistant Examiner*—My-Trang Nu Ton
*Attorney, Agent, or Firm*—B. Noel Kivlin; Conley, Rose & Tayon, P.C.

[57] ABSTRACT

A pipelined microprocessor is provided including a latch circuit wherein a first transmission gate is electrically coupled in series with a second transmission gate between an output line of a first pipeline stage and an input stage of a subsequent pipeline stage. The latch circuit is controlled by a single clock signal wherein a delay element is employed to simultaneously enable both transmission gates upon an edge of the clock signal. The length of time during which both transmission gates are enabled is determined by an electrical delay associated with the delay element. When both transmission gates are enabled, the input line is electrically coupled to the output line. A keeper circuit at the output of the second transmission gate retains a logical value at the output of the latch after the input line is decoupled from the output line. In one implementation, the delay element is implemented with a set of serially coupled inverters, and the length of the time delay controls the time window during which both transmission gates are enabled.

22 Claims, 5 Drawing Sheets

Prior Art Latch 5,684,422

PIPELINED MICROPROCESSOR INCLUDING A HIGH SPEED SINGLE-CLOCK LATCH CIRCUIT

This application is a continuation of application Ser. No. 08/378,175 filed Jan. 25, 1995, now abandoned.

BACKGROUND OF THE INVENTION

1. Field of the Invention

This invention relates to pipelined microprocessors and more particularly to latch circuits employed between stages in a pipelined microprocessor.

2. Description of the Relevant Art

Almost all modern microprocessors use a technique called pipelining to increase throughput at relatively low cost. Pipelining involves partitioning a process with "n" steps into "n" hardware stages separated by memory elements called registers which hold intermediate results. There is one pipeline stage for each step in the process, and these stages are connected in the same order that the steps are performed. By allowing each of the "n" stages to operate concurrently, the pipelined process can potentially operate at "n" times the rate of the non-pipelined process.

Pipelining is desirable when the propagation delay times of the stages are large relative to the propagation delay times of the registers. If the propagation delay times associated with the registers are significant compared to the propagation delay times of the stages, the performance benefits of pipelining are diminished. The propagation delay times of the registers continue to be barriers to achieving the theoretical "n"-fold increase in throughput. As a result, particularly close attention is paid to the designs of registers between pipeline stages in microprocessors. Every effort is made to minimize the propagation delay times of these registers.

A plurality of single latches is often used to implement a registers coupled between stages in pipelined microprocessors. FIG. 1 is a schematic diagram of a typical single latch employed between pipeline stages wherein a clock signal CLK and its complement are provided to control a transmission gate 104. When the CLK signal is logic high, transmission gate 104 is enabled, thereby electrically coupling input signal IN to node A. Inverter 106 drives output terminal OUT with the complement of the logical value at node A. Inverter 108 is a "trickle" feedback inverter provided to retain the logical value at node A after transmission gate 104 is disabled. Such a trickle inverter is characterized as a "weak" inverter whereby its output may be overpowered by the input signal IN when transmission gate 104 is enabled.

The simplicity of single latches results in relatively short propagation delay times and low costs. For the latch circuit of FIG. 1, output signal OUT is the logical complement of the input signal IN as long as clock signal CLK is logic high, and remains the logical complement of the last value of IN when CLK transition to logic low. This "transparency" property of latches may cause timing problems if the same clock signal is used to control the latch circuits associated with two successive pipeline stages. That is, if the latches of two successive pipeline stages are enabled simultaneously for a period of time longer than the propagation delay time of the first pipeline stage, a timing problem typically referred to as a race condition is created. When a race condition occurs, changes in logic levels may pass through the first stage and permanently into the second stage during the same clock cycle, thus leading to logic errors. Therefore, to eliminate possible race conditions, pipelined processors have long employed a technique of supplying alternate latches with clock signals which do not overlap (i.e., never enable two successive latches simultaneously).

As integrated circuit manufacturing processes improve, more and more devices and their interconnections are placed on a single dice or "chip." For very high speed microprocessors, the ability to generate and distribute high resolution two-phase clock signals which do not overlap is greatly diminished due to the capacitive loading on the clock drivers. "Clock skew" occurs when two clock signals travel along different paths with different delay times, arriving at different latches at different times. If this clock skew is severe enough, one clock signal may overlap the other, thus creating the possibility of race conditions as discussed previously. Relatively slow rise and fall times of the clock signals may further increase the effective overlapping.

SUMMARY OF THE INVENTION

The problems outlined above are in large part solved by a high-speed latch circuit including multiple transmission gates in accordance with the present invention. In one embodiment, a latch circuit is provided wherein a first transmission gate is electrically coupled in series with a second transmission gate between an input line and an output line. The latch circuit is controlled by a single clock signal wherein a delay element is employed to simultaneously enable both transmission gates upon an edge of the clock signal. Enabled is defined as the condition when the input of a transmission gate is electrically coupled, in a low impedance state, to its output, as a result of a logical high signal being applied to the gate of its n-channel transistor and a logical low signal being applied to the gate of its p-channel transistor. The length of time during which both transmission gates are enabled is determined by an electrical delay associated with the delay element. When both transmission gates are enabled, the input line is electrically coupled to the output line. A keeper circuit at the output of the second transmission gate retains a logical value at the output of the latch after the input line is decoupled from the output line by disabling the first transmission gate. In one implementation, the delay element is implemented with a set of serially coupled inverters, and the length of the time delay controls the time window during which both transmission gates are enabled.

When the latch circuit is employed between stages in a pipelined microprocessor, the latch circuit advantageously allows operation with a single clock signal with relatively low transition count. High frequencies of operation of the pipelined microprocessor are accommodated since the propagation time associated with the latch circuit is relatively low. Accordingly, the percent of delay cycle time utilized by the pipeline latch is relatively low. Race conditions may further be eliminated and capacitive loading of the clock driver may be reduced. In addition, by modifying the delay characteristics of the delay element, the latch circuit may be adjusted to operate optimally even if a new process technology is employed in fabrication to replace the one it was originally manufactured in. Finally, in one embodiment an inverter receiving the clock signal is configured with a relatively high trip point to ensure that ground noise does not falsely triggering the latch circuit.

BRIEF DESCRIPTION OF THE DRAWINGS

Other objects and advantages of the invention will become apparent upon reading the following detailed description and upon reference to the accompanying drawings in which.

Figure 1:
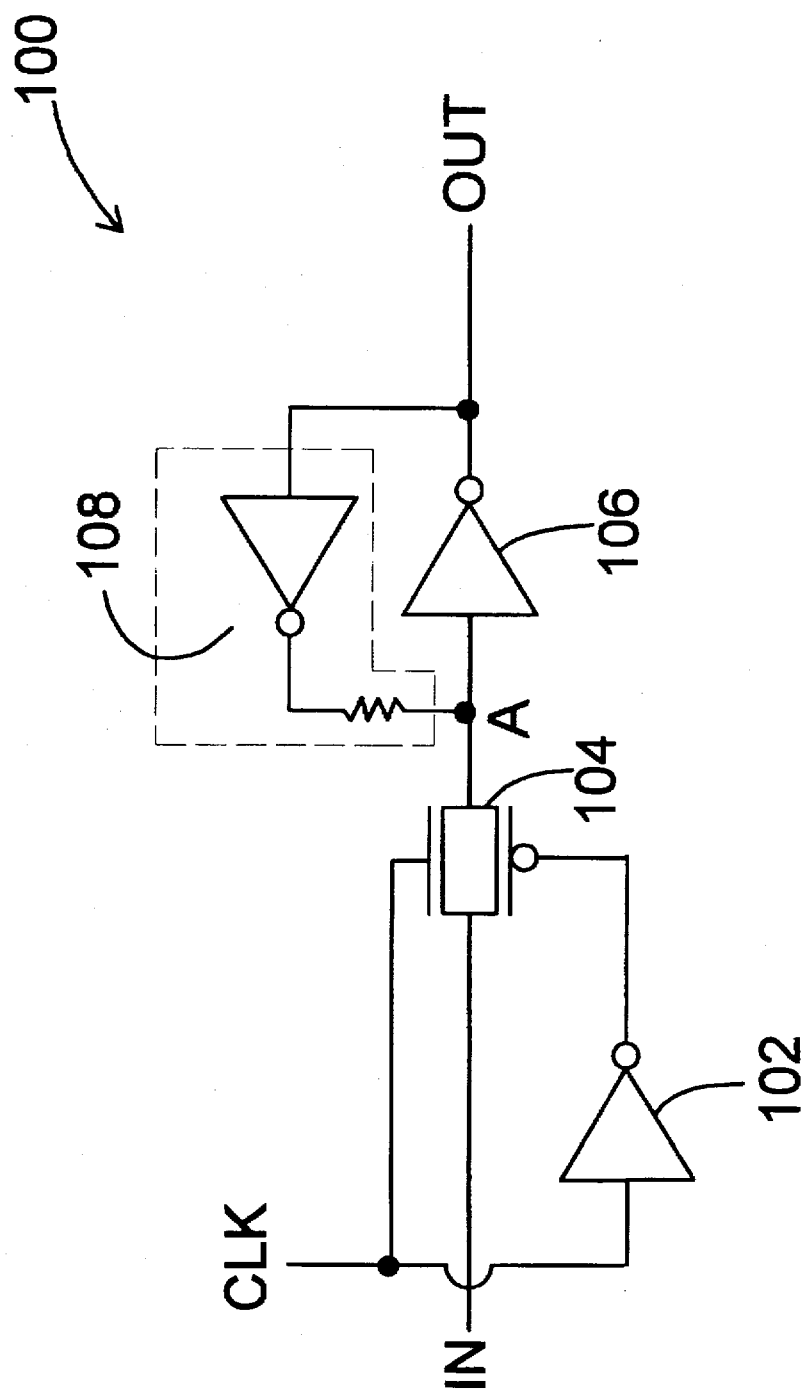
FIG. 1 is a schematic diagram of a typical static latch.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
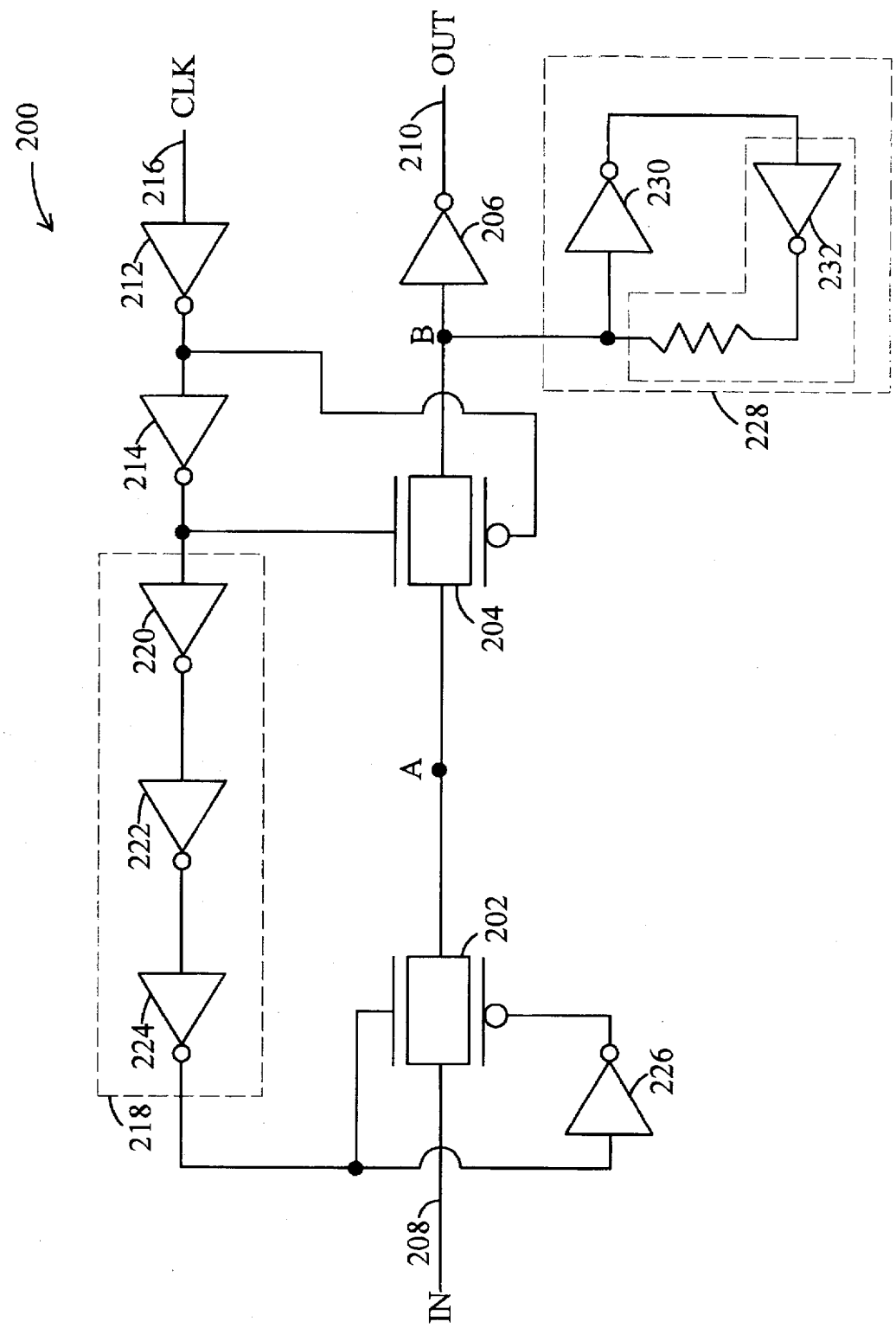
FIG. 2 is a schematic diagram of a high-speed latch for single-clock systems which is enabled on the rising edge of the clock signal.

Referring next to FIG. 2, a schematic diagram of a high-speed latch circuit 200 in accordance with the present invention is shown. Latch circuit 200 includes a first transmission gate 202, a second transmission gate 204, and an inverter 206 coupled serially between an input line 208 and an output line 210. The latch circuit 200 further comprises a pair of inverters 212 and 214 providing outputs to transmission gate 204. The input of inverter 212 is coupled to a clock input line 216. A delay element 218 is further coupled to the output of inverter 214. In the embodiment of FIG. 2, delay element 218 includes inverters 220, 222 and 224. An inverter 226 is coupled between the output of delay element 218 and a control terminal of transmission gate 202, and a keeper circuit 228 is shown coupled to the input of inverter 206.

Keeper circuit 228 is illustrated with an inverter 230 coupled to a trickle inverter 232. As will be appreciated by those of skill in the art, keeper circuit 228 is employed to ensure that the logical value at node B is maintained even after an input signal IN is electrically decoupled from node B (i.e., by disabling transmission gate 202). Inverter 230 has as its input the logical value at node B and its output drives the logical complement of the logical value at node B. Inverter 232 is a weak "trickle" inverter which has as its input the logical complement of the logical value at node B, and its output drives node B with the same logic value present at node B. Thus, trickle inverter 232 enables the keeper circuit to maintain the logic value at node B, and yet allow the logical value at node B to be overpowered (and thus changed) changed by input signal IN.

Figure 3:
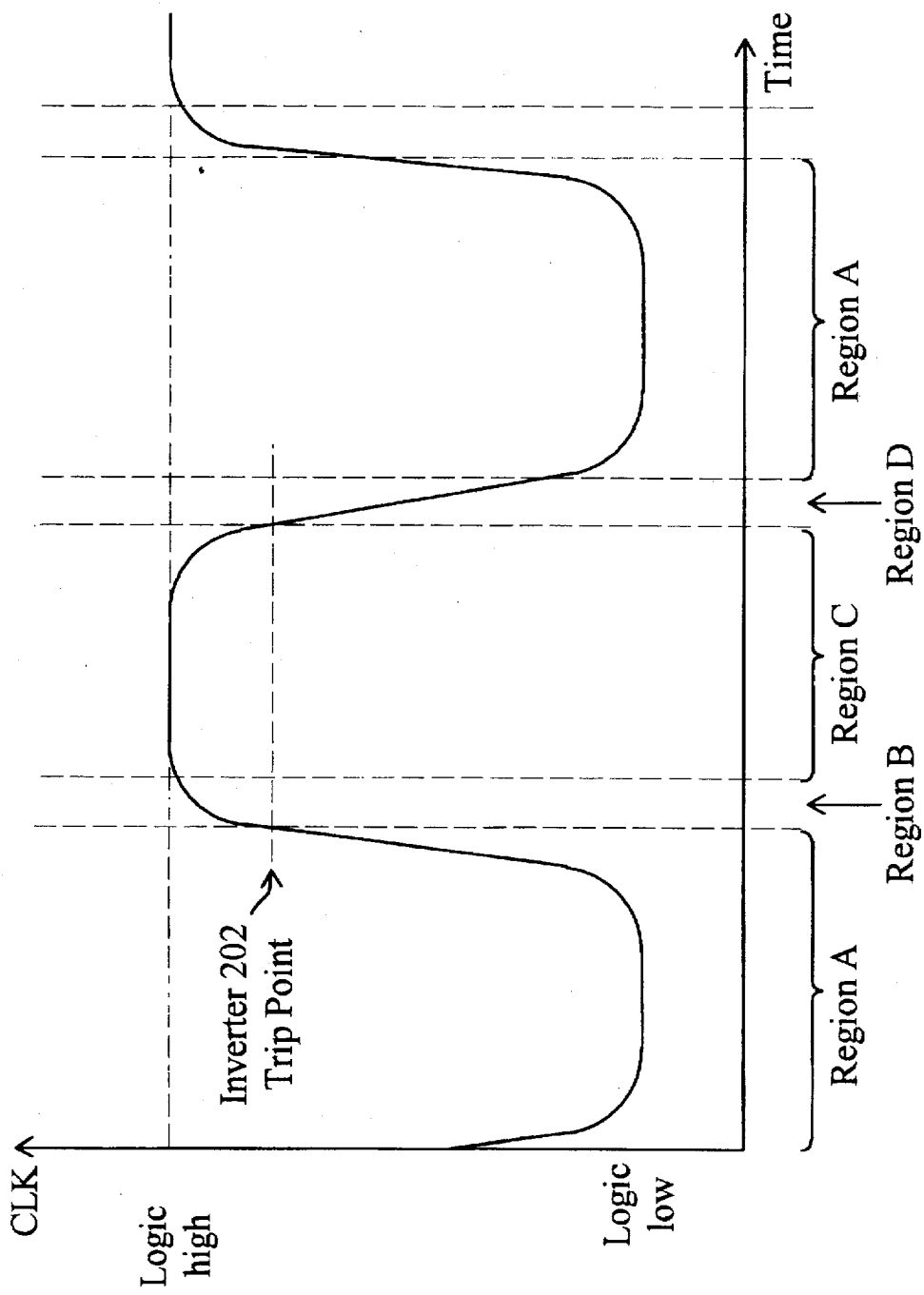
FIG. 3 is a timing diagram associated with the operation of the high-speed latch for single-clock systems.

The operation of latch 200 will next be described in conjunction with the timing diagram of FIG. 3. Referring collectively to FIGS. 2 and 3, during a region A when clock signal CLK is low, the output of inverter 212 is logic high, and the output of inverter 214 is logic low. Transmission gate 204 is thus disabled. The output of delay element 218 is logic high, and the output of inverter 226 is logic low. Transmission gate 202 is thus enabled, electrically coupling input line 208 to node A. It is noted that while transmission gate 204 is disabled, input line 208 is decoupled from output line 210. This decoupling prevents input signals from passing though the latch during region A, thus preventing race conditions.

In the one embodiment, inverter 212 is configured with a relatively high trip point, thereby preventing noise on clock input line 216 from inadvertently triggering latch circuit 200. During region B when clock signal CLK exceeds the trip point of inverter 212, the output of inverter 212 transitions to logic low, and the output of inverter 214 transitions to logic high one gate delay later. Transmission gate 204 is thus enabled. It is noted that the control inputs of transmission gate 202 do not change until after signal CLK has propagated through delay element 218. Thus transmission gate 202 remains enabled during region B as determined by the delay time of delay element 218, and node B attains the logic value of input signal IN at input line 208. It will be appreciated that in doing so, input signal IN must overcome any charge sharing from node B to node A as well as overpower the drive current of "trickle" inverter 226 in keeper circuit 222.

After the high transition of the clock signal CLK has propagated through delay element 218, the output of delay element 218 transitions to logic low, and the output of inverter 226 transitions to logic high one gate delay later. Transmission gate 202 is thus disabled, electrically decoupling node A from input line 208. This marks the end of region B of FIG. 3.

During region C when clock signal CLK is logic high, the output of inverter 212 is logic low and the output of inverter 214 is logic high. Transmission gate 204 thus remains enabled, electrically coupling node A to node B. At this time, the output of delay element 218 is logic low, and the output of inverter 226 is logic high. Thus transmission gate 202 is disabled. Output inverter 206 drives output line 210 with the logical complement of the logic value at node B. Keeper circuit 228 ensures the logic value at node B is retained even after the input signal IN is electrically decoupled from node B.

During region D, clock signal CLK drops below the trip point of inverter 212. The output of inverter 212 accordingly transitions to logic high, and the output of inverter 214 transitions to logic low. Transmission gate 204 is thus disabled, electrically decoupling node B from node A. The control inputs of transmission gate 202 will not change for a delay time as determined by delay element 218. Thus transmission gate 202 also remains disabled. Keeper circuit 228 continues to maintain the logic value stored at node B, and output inverter 206 drives output line 210 with the logical complement of the logic value stored at node B.

After the low transition of the clock signal CLK has propagated through delay element 218, the output of delay element 218 transitions to logic high, and the output of inverter 226 transitions to logic low one gate delay later. Transmission gate 202 is thus enabled, electrically coupling node A to input line 208 subsequent cycles of the clock signal CLK result in a similar operation.

Figure 4:
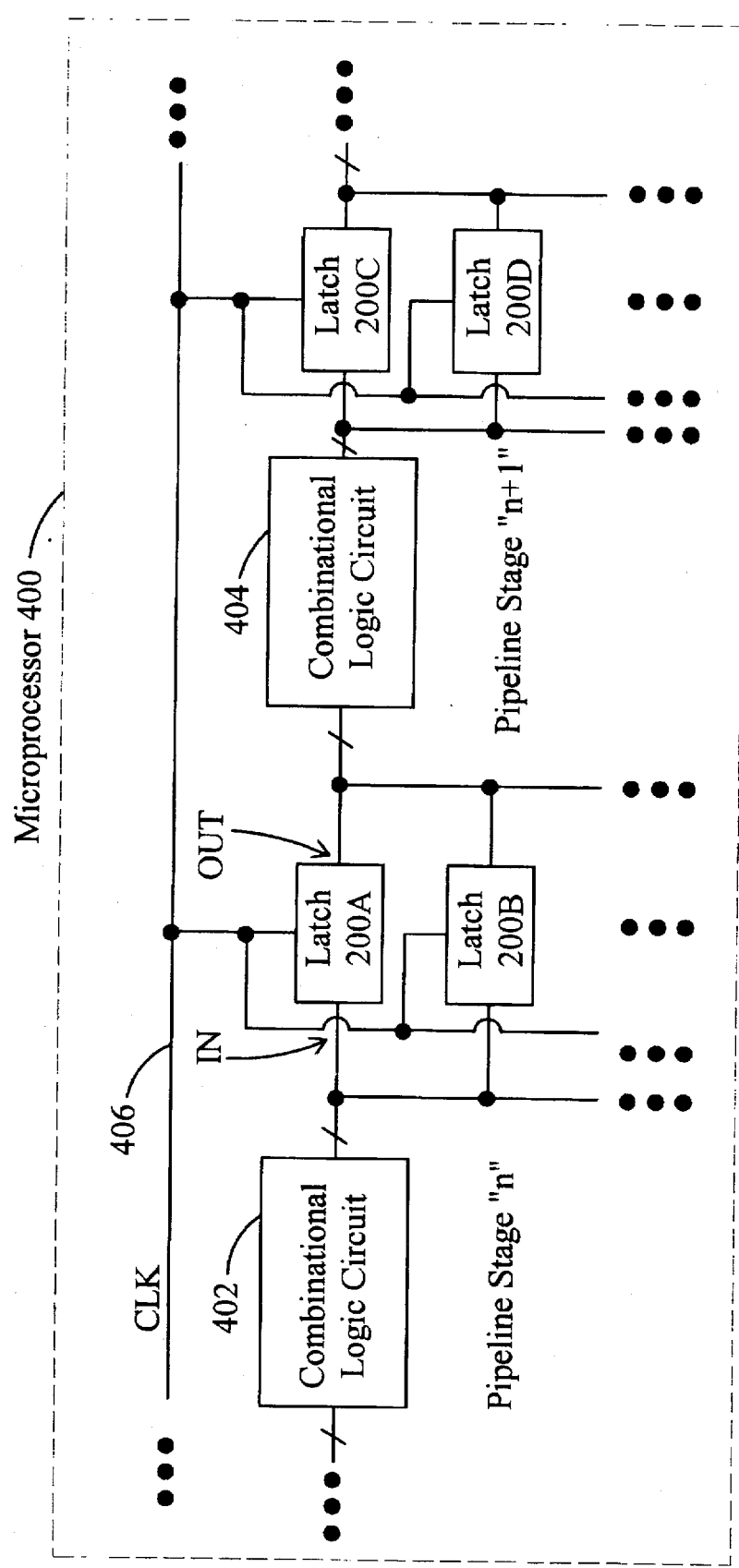
FIG. 4 is a block diagram of a pipelined microprocessor employing latches controlled by a single system clock in accordance with the present invention.

Referring now to FIG. 4, a block diagram of generalized portion of a pipelined microprocessor 400 which employs a plurality of latch circuits 200A–200D each embodied in accordance with the schematic diagram of FIG. 2 is shown. Each latch circuit 200 is controlled by a single system clock CLK at line 406. A combinational logic circuit 402 which forms a first pipeline stage "n" is coupled to latches 200A and 200B. A second combinational logic circuit 404 which forms a pipeline stage "n+1", has its inputs coupled to latches 200A and 200B and its outputs coupled to latched 200C and 200D. Latches 200A–200D receive a common clock input CLK through clock line 406. It will be appreciated that additional latch circuits may be similarly coupled between the pipeline stages of microprocessor 400.

Microprocessor 400 is configured such that while operating, valid output signals of combinational logic circuit 402 (pipeline stage "n") are assumed to reach the IN terminals of latches 200A and 200B by the end of region B of FIG. 3. Likewise, valid output signals of combinational logic circuit 404 (pipeline stage "n+1") are assumed to reach the IN terminals of latches 200C and 200D by the end of region B of FIG. 3. During region B of FIG. 3, the outputs of combinational logic circuit 402 are stored in latches 200A and 200B, and the outputs of combinational logic circuit 404 are stored in latches 200C and 200D. The logical complements of the output signals from combinational logic circuit 402 as stored by latches 200A and 200B are thus provided to the input lines of combinational logic circuit 404 (pipeline stage "n+1") during regions C, D, and region A of the next cycle of system clock CLK. Similarly, the logical complements of the output signals from combinational logic circuit 404 as stored by latches 200C and 200D may be provided to the input lines of a subsequent pipeline stage (not shown) during regions C, D, and region A of the next cycle of system clock CLK.

A latch circuit configured in accordance with the present invention may be advantageously employed between stages in a pipelined microprocessor clocked by a single-phase clock signal. The structures of latches 200 and 500 allow implementation with relatively few transistors and result in low propagation delays in comparison to other latch structures. Since the input signal is electrically coupled through enabled transmission gates to the latch's output line for only a short duration over the clock period, race conditions may be eliminated. The capacitive loading on the clock driver of a system employing latch 200 may further be reduced by virtue of driving only a single inverter per latch. Furthermore, in one embodiment, the inverter coupled to the clock signal may be configured with a relatively high trip point to ensure that ground noise does not allow false triggering of the latch circuit. Adverse affects due to charge sharing from node A to node B are further prevented as a result of the switching arrangement of transmission gates 202 and 204.

Figure 5:
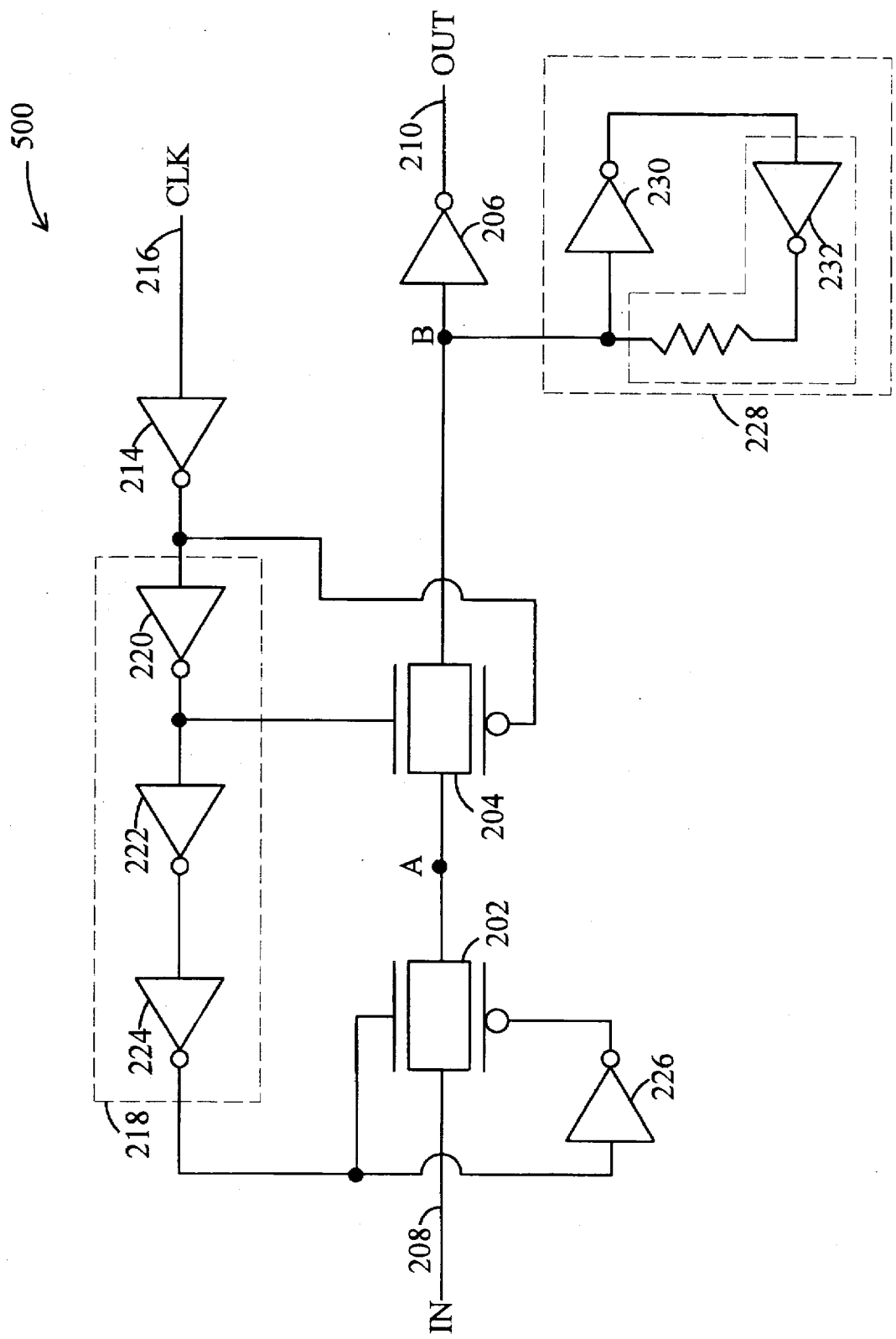
FIG. 5 is a schematic diagram of a high-speed latch for single-clock systems which is enabled on the falling edge of the clock signal.

Turning now to FIG. 5, an alternate embodiment of a latch circuit 500 is shown wherein the latch 500 is enabled upon the falling edge of the clock signal CLK rather than the rising edge. It will be appreciated that in latch 500, inverter 214 may be configured with a relatively high trip point, thereby preventing noise on clock input line 216 from inadvertently triggering latch circuit 500.

Numerous variations and modifications will become apparent to those skilled in the art once the above disclosure is fully appreciated. It is intended that the following claims be interpreted to embrace all such variations and modifications.

What is claimed is:

1. A pipelined microprocessor comprising:
   a first combinational logic circuit forming a first pipeline stage within said microprocessor;
   a second combinational logic circuit forming a subsequent pipeline stage within said microprocessor; and
   a latch circuit coupled between an output line of said first combinational logic circuit and an input line of said second combinational logic circuit, said latch circuit including:
      a plurality of transmission gates serially coupled between said first combinational logic circuit and said second combinational logic circuit, wherein a first of said plurality of transmission gates is controlled by a clock signal;
      a keeper circuit coupled to said first of said plurality of transmission gates, wherein said keeper circuit is configured to maintain a logic value at an output terminal of said first of said plurality of transmission gates; and
      a delay element coupled to a second of said plurality of transmission gates, wherein said second of said plurality of transmission gates is controlled by a delayed version of said clock signal, whereby an edge of said clock signal results in said first and said second of gate plurality of transmission gates being enabled concurrently for a predetermined period and wherein a node between said first transmission gate and said second transmission gate is floated when said second transmission gate is not enabled.

2. The pipelined microprocessor as recited in claim 1 wherein the delay element comprises:
   a first inverter having an input terminal connected to receive said clock signal, and an output terminal;
   a second inverter having an input terminal connected to said output terminal of the first inverter, and an output terminal; and
   a third inverter having an input terminal connected to said output terminal of the second inverter, and an output terminal coupled to a control terminal of said second of said plurality of transmission gates.

3. The pipelined microprocessor as recited in claim 1 wherein said delay element includes a plurality of serially coupled inverters.

4. The pipelined microprocessor as recited in claim 1 wherein said latch circuit further comprises an output inverter coupled between said first of said plurality of transmission gates and an output line of said latch circuit.

5. The pipelined microprocessor as recited in claim 1 wherein said keeper circuit comprises:
   a first inverter having an input terminal coupled to said output terminal of said first of said plurality of transmission gates; and
   a trickle inverter having an input terminal connected to an output terminal of said first inverter, and an output terminal coupled to the input terminal of said first inverter.

6. A pipelined microprocessor comprising:
   a first combinational logic circuit forming a first pipeline stage within said microprocessor;
   a second combinational logic circuit forming a subsequent pipeline stage within said microprocessor; and
   a latch circuit coupled between an output line of said first combinational logic circuit and an input line of said second combinational logic circuit, said latch circuit including:
      a data input node for receiving an input signal;
      a first transmission gate having a first terminal coupled to said data input node, a second terminal, and a control terminal;
      a second transmission gate having a first terminal coupled to said second terminal of said first transmission gate, a second terminal, and a control terminal coupled to receive a clock signal;
      a keeper circuit coupled to said second terminal of said second transmission gate, wherein said keeper circuit is configured to maintain a logic value at said second terminal of said second transmission gate; and
      a delay element coupled to said control terminal of said first transmission gate, wherein said delay element is capable of delaying said clock signal to thereby provide a delayed clock signal to said control terminal of said first transmission gate, whereby an edge of said clock signal results in said first transmission gate and said second transmission gate being enabled concurrently for a predetermined period and wherein a node between said first transmission gate and said second transmission gate is floated when said first transmission gate is not enabled.

7. The pipelined microprocessor as recited in claim 6 wherein said delay element comprises:
a first inverter having an input terminal connected to receive said clock signal, and an output terminal;
a second inverter having an input terminal connected to said output terminal of the first inverter, and an output terminal; and
a third inverter having an input terminal connected to said output terminal of the second inverter, and an output terminal connected to said control terminal of said first transmission gate.

8. The pipelined microprocessor as recited in claim 6 wherein said latch circuit further comprises a first inverter having an input line coupled to said second terminal of said second transmission gate.

9. The pipelined microprocessor as recited in claim 6 wherein said delay element of said latch circuit includes a plurality of serially coupled inverters.

10. A pipelined microprocessor comprising:
a first combinational logic circuit forming a first pipeline stage within said microprocessor;
a second combinational logic circuit forming a subsequent pipeline stage within said microprocessor; and
a latch circuit coupled between an output line of said first combinational logic circuit and an input line of said second combinational logic circuit, said latch circuit including:
  a plurality of transmission gates serially coupled between said first combinational logic circuit and said second combinational logic circuit, wherein a first of said plurality of transmission gates is controlled by a clock signal;
  a keeper circuit coupled to said first of said plurality of transmission gates, wherein said keeper circuit is configured to maintain a logic value at an output terminal of said first of said plurality of transmission gates; and
  a delay element coupled to a second of said plurality of transmission gates, wherein said second of said plurality of transmission gates is controlled by a delayed version of said clock signal, whereby an edge of said clock signal results in said first and said second of said plurality of transmission gates being enabled concurrently for a predetermined period such that said input signal is latched only when said first transmission gate and said second transmission gate are concurrently enabled and wherein a node between said first transmission gate and said second transmission gate is floated when said second transmission gate is not enabled.

11. A pipelined microprocessor, comprising:
a first combinational logic circuit forming a first pipeline stage within said microprocessor;
a second combinational logic circuit forming a subsequent pipeline stage within said microprocessor; and
a latch circuit coupled between an output line of said first combinational logic circuit and an input line of said second combinational logic circuit, said latch circuit including:

a data input node for receiving an input signal;
a first transmission gate having a first terminal coupled to said data input node, a second terminal, and a control terminal such that said input signal is transmitted from said first terminal of said first transmission gate to said second terminal of said first transmission gate when said first transmission gate is enabled;
a second transmission gate having a first terminal, a second terminal, and a control terminal, wherein said first terminal of said second transmission gate is coupled to the second terminal of said first transmission gate, and wherein said control terminal of said second transmission gate is coupled to receive a clock signal;
a keeper circuit coupled to the second terminal of the second transmission gate, wherein said keeper circuit is configured to maintain a logic value at said second terminal of said second transmission gate; and
a delay element coupled to said control terminal of said first transmission gate, wherein said delay element is configured to delay said clock signal to thereby provide a delayed clock signal to said control terminal of said first transmission gate, whereby an edge of said clock signal results in said first transmission gate and said second transmission gate being enabled concurrently for a predetermined period; and wherein a logic value reflecting a value of said input signal is established at said first terminal of said second transmission gate and said second terminal of said second transmission gate only during said predetermined period of time when said first transmission gate and said second transmission gate are concurrently enabled and wherein a node between said first transmission gate and said second transmission gate is floated when said first transmission gate is not enabled.

12. The pipelined microprocessor as recited in claim 11 wherein said keeper circuit comprises:
a first inverter having an input terminal connected to the second terminal of said second transmission gate, and an output terminal; and
a trickle inverter having an input terminal connected to the output terminal of the first inverter, and an output terminal connected to the input terminal of the first inverter.

13. The pipelined microprocessor as recited in claim 11 wherein said delay element comprises:
a first inverter having an input terminal connected to receive said clock signal, and an output terminal;
a second inverter having an input terminal connected to said output terminal of the first inverter, and an output terminal; and
a third inverter having an input terminal connected to said output terminal of the second inverter, and an output terminal connected to said control terminal of said first transmission gate.

14. The pipelined microprocessor as recited in claim 11 wherein said latch circuit further comprises a first inverter coupled in series with a second inverter, wherein an output line of said second inverter is coupled to an input line of said delay element whereby said clock signal propagates through said first and second inverters prior to propagating through said delay element.

15. The pipelined microprocessor as recited in claim 14 wherein an output line of said second inverter is coupled to said control terminal of said second transmission gate.

16. The pipelined microprocessor as recited in claim 15 wherein an output line of said first inverter is coupled to a second control terminal of said second transmission gate.

17. The pipelined microprocessor as recited in claim 11 wherein said latch circuit further comprises an inverter having an output line coupled to an input line of said delay element whereby said clock signal propagates through said inverter prior to propagating through said delay element.

18. The pipelined microprocessor as recited in claim 17 wherein in said latch circuit the output line of said inverter is coupled to said control terminal of said second transmission gate.

19. The pipelined microprocessor as recited in claim 11 wherein said latch circuit further comprises a first inverter having an input line coupled to said second terminal of said second transmission gate.

20. The pipelined microprocessor as recited in claim 11 wherein said delay element includes a plurality of serially coupled inverters.

21. A pipelined microprocessor comprising:

a first combinational logic circuit forming a first pipeline stage within said microprocessor;

a second combinational logic circuit forming a subsequent pipeline stage within said microprocessor; and a latch circuit coupled between an output line of said first combinational logic circuit and an input line of said second combinational logic circuit, said latch circuit including:

a data input node for receiving an input signal;

a first transmission gate having a first terminal coupled to said data input node, a second terminal, and a control terminal, wherein said first transmission gate is configured such that said input signal is transmitted from said first terminal of said first transmission gate to said second terminal of said first transmission gate when said first transmission gate is enabled;

a second transmission gate having a first terminal, a second terminal, and a control terminal, wherein said first terminal of said second transmission gate is coupled to the second terminal of said first transmission gate, and wherein said control terminal of said second transmission gate is coupled to receive a clock signal;

a keeper circuit coupled to the second terminal of the second transmission gate, wherein said keeper circuit is configured to maintain a logic value at said second terminal of said second transmission gate; and a delay element coupled to said control terminal of said first transmission gate, wherein said delay element is configured to delay said clock signal to thereby provide a delayed clock signal to said control terminal of said first transmission gate, whereby an edge of said clock signal results in said first transmission gate and said second transmission gate being enabled concurrently for a predetermined period; and wherein a node between said first transmission gate and said second transmission gate is floated when said first transmission gate is not enabled.

22. The pipelined microprocessor of claim 21, wherein said second terminal of said first transmission gate is directly connected to said first terminal of said second transmission gate through a passive connection.

* * * * *

UNITED STATES PATENT AND TRADEMARK OFFICE
CERTIFICATE OF CORRECTION

PATENT NO. : 5,684,422
DATED : November 4, 1997
INVENTOR(S) : David B. Witt and Marty Pflum It is certified that error appears in the above-identified patent and that said Letters Patent is hereby corrected as shown below:

In the Claims:

Claim 1, Column 6, line 11, please replace the word "gate" with the word "said".

Signed and Sealed this

Third Day of February, 1998

BRUCE LEHMAN

Attest:

Attesting Officer

Commissioner of Patents and Trademarks